Jan. 27, 1959     I. NESSON     2,871,043
TELESCOPING WIPER ARM
Filed Feb. 2, 1955     2 Sheets-Sheet 1
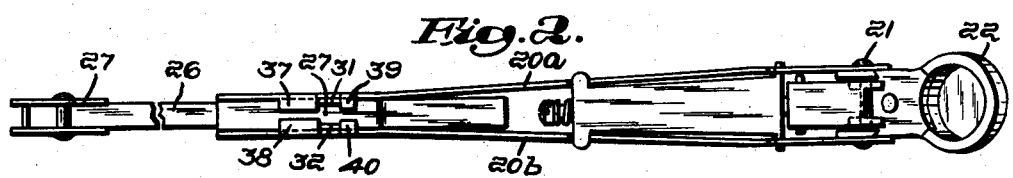
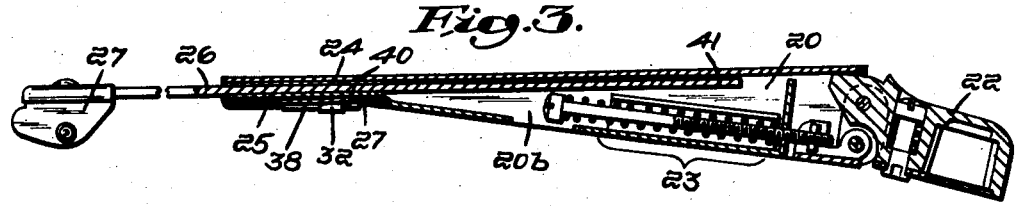
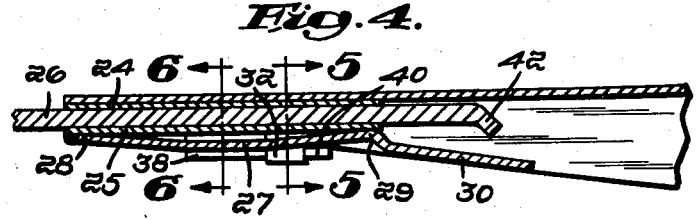
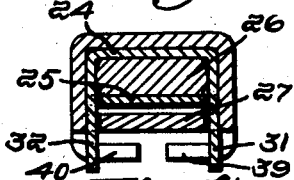
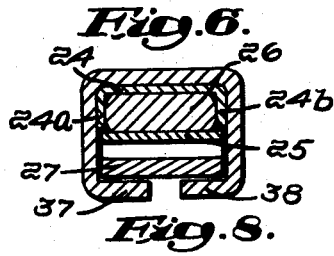
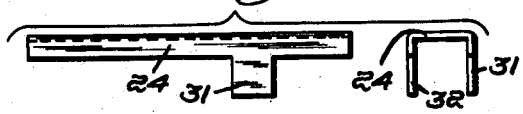
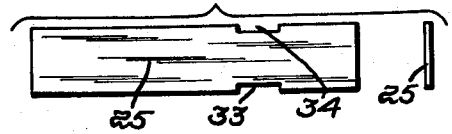
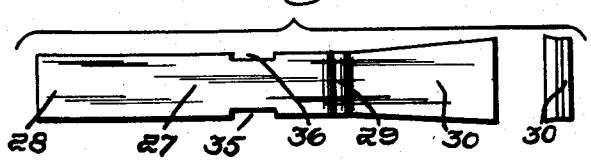
Inventor:
Israel Nesson,
by Arthur D. Thomas
Attorney

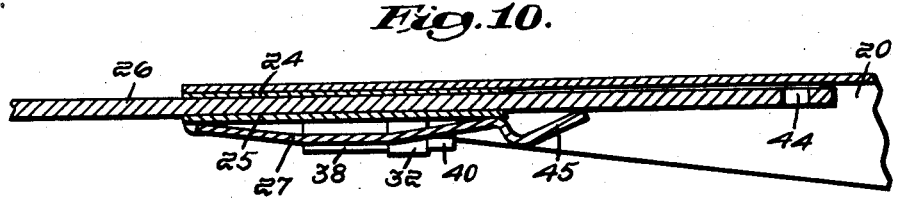
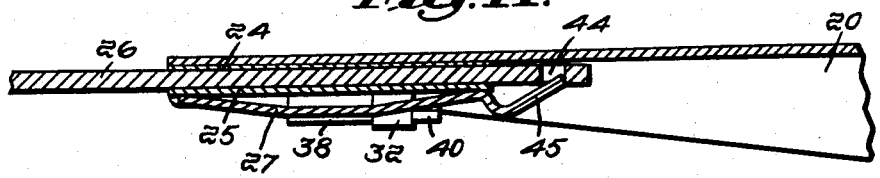
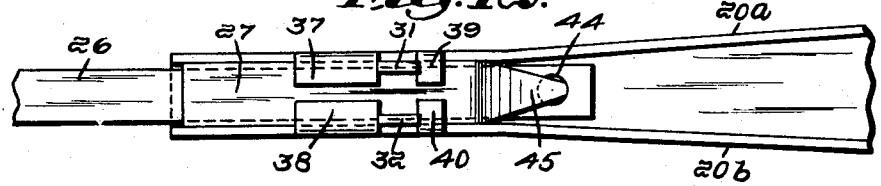

United States Patent Office 2,871,043
Patented Jan. 27, 1959

2,871,043

TELESCOPING WIPER ARM

Israel Nesson, Lynn, Mass., assignor to
Max Zaiger, Swampscott, Mass.

Application February 2, 1955, Serial No. 485,739

6 Claims. (Cl. 287—58)

This invention relates to windshield wiper arms and, more particularly, to improvements in the construction of arms of adjustable length, of the type shown, for example, in my previous Patent No. 2,466,609.

A windshield wiper assembly consists in general of a wiper drive shaft, a wiper blade, and an arm which is attached at its lower end to the wiper drive shaft and at its upper end to the blade, ordinarily at about the center of the blade. The length of the blade determines the position, and to some extent, the sweep of the blade. The position of the drive shaft with respect to the windshield varies for different makes and styles of automobiles, and different makes of blades may vary in length. Also a driver may desire to change the length of the arm to cause the blade to sweep a higher or lower region on the windshield to suit his own eye level, and personal preferences. He may also desire to insert a longer blade, so as to sweep a larger area. For these reasons a wiper arm of adjustable length, which can be adapted to various installations and conditions is desired.

Arms of the type to which this invention relates consist in general of an arm base carrying an extension bar which telescopes within the base. The general object of this invention is to produce a connection between the base and the extension bar of such an arm which provides a maximum of bearing area for the bar in a limited space, which allows the bar to be adjusted smoothly, and which yet will hold the bar in its adjusted setting under the jolting, vibration, and wind forces to which a wiper is ordinarily subjected. Other objects and advantages of the arm will be apparent from the following description.

The arm consists in general of a channel-shaped arm base, in the upper end of which are housed a bearing channel, a bearing plate covering the open side of the channel and forming a box in which an arm extension bar is slidably received, and a leaf spring having a transverse shoulder which presses the plate and channel toward each other so as to bear on the bar and hold it in place by frictional engagement. The bearing channel and plate are preferably made of a soft metal, such as bronze, which provides a good bearing surface for the extension bar which is ordinarily made of steel. The extension bar may have a straight inner end, so as to be separable from the base, or may have a bent over end tab or other device for engaging the spring or the plate when the bar is drawn out to its limit, to prevent separation of the bar from the arm base.

In the drawings illustrating the invention:

Fig. 1 is a side view of an arm constructed according to the invention;

Fig. 2 is a bottom view of the arm;

Fig. 3 is a longitudinal cross-section of the arm;

Fig. 4 is an enlarged cross-section, partly broken away, of the arm in the region of the junction between the arm base and the extension bar, showing the bar in slightly modified form;

Fig. 5 is a cross-section along line 5—5 of Fig. 4;

Fig. 6 is a cross-section along line 6—6 of Fig. 4;

Fig. 7 is a detail of the bearing channel;

Fig. 8 is a detail of the bearing plate;

Fig. 9 is a detail of the bearing spring;

Fig. 10 is a cross-section similar to Fig. 4, showing a modification of the extension bar and spring;

Fig. 11 is a cross-section similar to Fig. 4, showing the modification of Fig. 10 with the extension bar fully extended; and Fig. 12 is a bottom view of the modification of Fig. 10.

The channel shaped arm base 20 is hinged by a pin 21 to a coupling 22, which may be of any conventional type suitable for connecting the arm to the wiper drive shaft. As shown in Fig. 1, the side walls 20a and 20b of the arm base are tapered so that the left-hand end is fairly shallow. In the deeper, right-hand end is housed a spring assembly generally indicated by the numeral 23, which is here illustrated as being of a type which is the subject of my copending application Serial No. 482,303, now Patent 2,782,450, filed Jan. 17, 1955. However, a conventional tension spring arrangement may be employed.

In the left-hand end of the arm base is mounted a bearing channel 24, which is preferably made of bronze and fits fairly tightly inside the base. A bearing plate 25 covers the bottom opening of the bearing channel to form a box in which the arm extension bar 26 is slidably received. The latter carries on its outer end a clip 26a of any suitable construction for attachment to the wiper blade. As shown in Fig. 6, the legs 24a and 24b of the bearing channel are somewhat shorter than the thickness of the extension bar, so that the plate 25 bears on the bar rather than the ends of the legs. The legs are made to fit fairly closely to the edges of the bar, so as to be in frictional engagement with the edges, and also to hold the bar in alignment with the arm. Below the bearing plate 25 is a leaf spring 27. This spring has a bowed portion the ends of which, 28 and 29, bear against the plate. This portion of the spring is all that is essential, but the spring may be formed into a shoulder in the region of the end 29 of the bowed portion, and may have an extension 30 which lies flush with the lower edges of the arm base.

As shown in Figs. 5–9, the channel 24 has lugs 31 and 32 which project downward through notches 33 and 34, respectively, in plate 25, and also through notches 35 and 36, respectively, in spring 27. The arm base 20 has a first pair of tabs 37 and 38, and a second pair of tabs 39 and 40, all of which are bent inward under spring 27. Lug 31 projects down between tabs 37 and 39, and lug 32 projects down between tabs 38 and 40. The spring, plate, and bearing channel are thus locked against longitudinal movement in the arm base. Tabs 37, 38, 39 and 40 are bent over tightly enough against the spring to insure that the necessary pressure is applied to the arm extension when the latter is engaged between the baring channel and the bearing plate. This arrangement provides a good frictional engagement between the arm extension and the bearing channel and plate, so that the arm will stay in its adjusted position, but the extension can nevertheless be easily pulled out or pushed in to change the overall length of the arm as desired.

In Fig. 3 the arm extension 26 is shown as having a straight inner end 41. In this version, the extension bar can be pulled all the way out and another similar extension bar installed on the base. Extension bars of various lengths can thus be used with the same base so as to cover a wide range of arm lengths.

In some cases it may be more desirable to have the arm base and extension bar arranged so that they cannot be taken apart. One such construction is shown in Fig. 4. Here the bar has a bent down tab 42 on its inner end. When the extension bar is pulled out to its limit, tab 42 engages the edge of plate 25, and shoulder 29 of the spring and prevents removal of the extension from the base. Figs. 10, 11 and 12 show modifications of this structure in which spring 27 has a bent up tongue 45 which frictionally engages the under side of extension bar 26 when the bar is in an intermediate position as shown in Fig. 10. The extension bar has a hole 44 near its inner end, and the tongue 45 snaps into this hole when the bar is pulled out to its limit. The tongue is slanted toward the inner end of the bar so that it will ride out of the hole if the bar is subsequently pushed inward.

All of the constructions here shown can be easily manufactured and assembled and, once assembled, there is nothing in the arm and base connection to come loose or get out of adjustment. The relatively long bearing provided on all four sides of the bar by the channel and plate insures smooth operation and maintains the bar in proper alignment with the base in all positions.

I claim:

1. A windshield wiper arm comprising a channel-shaped arm base having depending side walls, a channel-shaped bearing member disposed in said base and having depending legs aligned with said side walls, a bearing plate disposed alongside said member and forming therewith a generally rectangular tube-like enclosure, an arm extension bar of generally rectangular cross-section received in said enclosure and slidable therein to adjust the overall length of the arm, a bowed leaf spring having end portions engaging said plate, said spring having an intermediate portion spaced from said plate, and tabs on said side walls bent inward toward each other and engaging said intermediate portion, said tabs being fixed in such a position as to cause said spring to press said plate and said member together to bear constantly on said bar with sufficient force to hold the bar in any position to which it is adjusted.

2. A wiper arm as described in claim 1, said spring and said plate having aligned notches, and said bearing member having depending lugs engaged in said notches, and each of said side walls having two bent-in tabs, one lying on either side of one of said lugs to lock the bearing member, plate and spring against longitudinal movement in the base.

3. A windshield wiper arm comprising an arm base, a pair of flat elongated bearing members disposed spaced apart and parallel to each other, an arm extension bar having flat top and bottom surfaces, engaged between said bearing members with its top and bottom surfaces in engagement therewith and slidable between said members to adjust the overall length of the arm, and a spring engaging one of said members and disposed to continually press said members together to bear constantly on said surfaces with sufficient force to hold the bar in any position to which it is adjusted, said bar having an inner end tab engageable with one of said members to limit the outward travel of the bar with respect to the base.

4. A windshield wiper arm comprising an arm base, a pair of flat elongated bearing members disposed on said arm base, said members being spaced apart and parallel to each other, an arm extension bar, having flat top and bottom surfaces, and an inner end, said bar being engaged between said bearing members with its top and bottom surfaces in engagement therewith and slidable between said members toward and away from said base to adjust the overall length of the arm, a hole in said bar near the inner end thereof, and a leaf spring having a bowed portion engaging one of said members and disposed to continually press the members together to bear constantly on said surfaces with sufficient force to hold the bar in any adjusted position, said spring also having a sloping tongue engageable in said hole to limit the outward travel of the bar away from the base, the tongue sloping in such a manner as to oppose outward movement of the bar when engaged in said hole but to ride out of the hole and frictionally engage said bottom surface as the bar is moved toward the base.

5. In a windshield wiper arm having a channelled arm base and an adjustable arm extension bar, means slidably receiving and frictionally retaining said bar in adjusted positions with respect to said base, said means comprising a channelled member, a plate disposed in spaced parallel relation to the edges of the channelled member, a spring disposed to continuously bear against said plate to press the latter against an extension bar received in said channelled member with sufficient force to hold the bar in adjusted position, said channelled member having a pair of lugs, and said spring and plate having pairs of aligned notches in which said lugs are received, and said base having means engaging the lugs to prevent longitudinal movement of the plate, spring, and channelled member.

6. A windshield wiper arm comprising an arm base, a channelled member disposed in said base, a plate disposed in spaced parallel relation to said channelled member, a generally rectangular arm extension bar slidably received and frictionally engaged between said channelled member and said plate, said bar having a smooth inner end disposed inwardly of said channelled member and plate but slidable therebetween to permit separation of the bar from the arm base, a spring disposed to bear continually against said plate and press the plate against said bar, said channelled member having a pair of lugs, and said plate and spring having aligned pairs of notches in which said lugs are received, and said arm base having means engaging said lugs to prevent longitudinal movement of the channelled member, plate, and spring.

References Cited in the file of this patent
UNITED STATES PATENTS

| | | |
|---|---|---|
| 2,229,720 | Bramming | Jan. 28, 1941 |
| 2,312,279 | Zaiger | Feb. 23, 1943 |
| 2,350,134 | Smulski | May 30, 1944 |